United States Patent Office 2,721,876
Patented Oct. 25, 1955

2,721,876

DIALKYL 2-CYANOPROPENE-3-PHOSPHONATES

Joseph B. Dickey and Harry W. Coover, Jr., Kingsport, Tenn., assignors to Eastman Kodak Company, Rochester, N. Y., a corporation of New Jersey No Drawing. Application October 13, 1950,
Serial No. 190,055

11 Claims. (Cl. 260—461)

This invention relates to cyanopropene phosphonates, to polymers thereof, and to a process for their preparation.

It is known that dialkyl 1-propene-2-phosphonates do not homopolymerize to resinous products. For example, R. V. Lindsey, Jr., in United States Patent 2,439,214, dated April 6, 1948, indicates that alpha, beta-ethylenically unsaturated phosphonic acid compounds including their esters have been found to be unpolymerizable to resinous polymers either by themselves or in admixture with various diene compounds despite numerous attempts to polymerize them. It is surprising, therefore, that contrary to this teaching, we have now found that the related propene phosphonates which contain a nitrile group and which can be represented by the general formula:

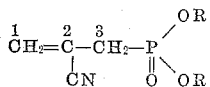

wherein R represents an alkyl group containing from 1 to 4 carbon atoms such as, for example, methyl, ethyl, propyl, isopropyl, butyl, etc. groups, can be readily homopolymerized or copolymerized with one or more polymerizable, ethylenically unsaturated organic compounds in varying amounts under conventional polymerization conditions. The products obtained are clear, hard resins which are moldable into shaped objects characterized by being tough and flame resistant. The monomers are also useful as intermediates for the preparation of other monomeric organic compounds.

It is, accordingly, an object of the invention to provide a new class of unsaturated phosphonates. Another object is to provide resinous polymers of the same. Another object is to provide a process for preparing the new class of compounds. Other objects will become apparent hereinafter.

In accordance with the invention, we prepare the new class of dialkyl 2-cyanopropene-3-phosphonates by reacting an alpha-halomethyl acrylonitrile such as, for example, α-chloromethyl acrylonitrile, α-bromomethyl acrylonitrile, etc. with about an equivalent amount of a trialkyl phosphite or with an alkali-metal salt of a dialkyl hydrogen phosphite, heating the reaction mixture until the alkyl halide by-product which forms is distilled off, preferably until the stoichiometric quantity of the alkyl halide is separated from the mixture, and then separating the formed dialkyl 2-cyanopropene-3-phosphonate from the residual reaction mixture by conventional means, preferably by fractional distillation of the mixture. Where the alkali-metal salt of a dialkyl hydrogen phosphite is employed, the reaction is preferably carried out in an inert solvent medium such as benzene, toluene, xylene, low boiling saturated hydrocarbons, etc., in which case the alphahalomethyl acrylonitrile is added gradually or dropwise to the solution containing the alkali-metal salt of the dialkyl hydrogen phosphite, meanwhile maintaining the reaction mixture at a temperature of from 0° to 15° C., and then on completion of the addition heating the reaction mixture to gentle reflux for an hour or more, followed by distilling off the inert solvent and separating the dialkyl 2-cyanopropene-3-phosphonate by fractional distillation of the residual reaction mixture.

Suitable phosphites include trimethyl phosphite, triethyl phosphite, tripropyl phosphite, tributyl phosphite, sodium dimethyl phosphite, sodium diethyl phosphite, potassium dibutyl phosphite, lithium dimethyl phosphite, and similar kinds of other alkali-metal dialkyl phosphites. The reaction between the alpha-haloacrylonitrile and the mentioned phosphite compounds is carried out preferably with equimolar quantities, although an excess of either type of reagent will also give relatively good results. The temperature of the reaction where a trialkyl phosphite is employed can be varied widely, but preferably a temperature is maintained sufficient to cause reaction to take place and to distill off the alkyl halide as it is formed, that is, from 20° C. to 150° C.

The polymerization of the new compounds of the invention alone or conjointly with each other or with one or more unsaturated organic compounds is advantageously carried out in the presence of a polymerization catalyst. Peroxide polymerization catalysts which are soluble in the monomers or in solvent mediums for the polymerization can be employed, e. g., organic peroxides such as benzoyl peroxide, acetyl peroxide, lauroyl peroxide, tertiary butyl hydroperoxide, etc. Water soluble inorganic peroxides can also be used, e. g., hydrogen peroxide, ammonium persulfate, potassium persulfate, sodium persulfate, persulfuric acid, sodium perborate, the water-soluble salts of percarbonic acid, the water-soluble salts of perphosphoric acid, the water-soluble salts of sulfo-per-acid (Caro's acid). Boron trifluoride is also an effective polymerization catalyst. Mixtures of the catalysts can be employed. The amount of catalyst employed can advantageously be from 0.1 to 1% by weight of the monomers to be polymerized.

The polymerizations can be carried out in bulk (mass), in solvents or in heterogeneous dispersion where the monomer or mixture of monomers is dispersed in a non-solvent for the monomers, the particles of dispersed monomers being small (emulsion) or relatively large (bead or granular). In both bulk and solvent polymerizations, the organic peroxide catalysts are advantageously employed. Suitable solvents include benzene, toluene, ethanol, acetone, acetonitrile and acetic acid.

For emulsion polymerizations any non-solvent for the monomer or the mixture of monomers can be employed, water being especially advantageous. The monomer or mixture of monomers can be advantageously emulsified in water using emulsifying agents such as salts of higher fatty acids, e. g., sodium or potassium stearate, palmitate, etc., or ordinary soaps, salts of higher fatty alcohol sulfates, e. g., sodium or potassium lauryl sulfate, sodium or potassium di(2-ethylhexyl) sulphosuccinate, sodium or potassium cetyl sulfate, sodium or potassium stearyl sulfate, etc., salts of aromatic sulfonic acids, e. g., sodium or potassium salts of alkylnaphthalene sulfonic acids, etc., higher molecular weight quaternary ammonium salts, e. g., dimethyl benzylphenyl ammonium chloride, quaternary ammonium salts containing the radicals $C_{15}H_{31}$ and $C_{17}H_{35}$, etc. Mixtures of emulsifying agents can be employed. For bead or granular polymerizations, relatively poor dispersing agents such as starch, methylated starch, gum arabic, polyvinyl alcohol, partly hydrolyzed polyvinyl acetate, gelatin, sodium glycolate, etc., can be employed. Mixtures of these dispersing agents can also be used. In the above polymerizations wherein the monomer or mixtures of monomers is dispersed in a non-solvent, the dispersion and polymerization can be facilitated by stirring, shaking or tumbling the polymerization mixture. Heat accelerates all the polymerizations, a temperature of from 20° to 125° C. for a period of from about 30 minutes to as much as several days or more being efficacious.

The copolymers of the invention can contain variable amounts of each comonomer and are obtained with starting mixtures containing from 5 to 95 parts by weight of the new dialkyl 2-cyanopropene-3-phosphonates of the invention and from 95 to 5 parts by weight of one or more other unsaturated organic compounds. Suitable other unsaturates for copolymerizing with the new compounds of the invention include vinyl carboxylic acid esters such as vinyl acetate, vinyl propionate, vinyl benzoate, etc., alkyl esters of acrylic and methacrylic acids such as methyl acrylate, ethyl acrylate, butyl acrylate, methyl methacrylate, unsaturated nitriles such as acrylonitrile, methacrylonitrile, etc., vinyl hydrocarbons such as styrene, α-methylstyrene, vinyl chloride, isopropenyl acetate, allyl acetate, methallyl acetate and similar ethylenically unsaturated organic compounds.

The following examples will serve further to illustrate the dialkyl 2-cyanopropene-3-phosphonates of the invention, polymers thereof and the manner of preparing the same.

*Example 1.—Diethyl 2-cyanopropene-3-phosphonate*

14.6 g. (0.1 mol) of α-bromomethyl acrylonitrile and 16.6 g. (0.1 mol) of triethyl phosphite were heated in a distillation flask at such a temperature that ethyl bromide (B. P. 38° C.) distilled from the reaction mixture. Heating was continued until a theoretical yield of ethyl bromide was collected in the receiver. Fractional distillation of the residual material in the flask under reduced pressure gave an excellent yield of diethyl 2-cyanopropene-3-phosphonate, B. P. 150–153° C./2 mm.

By proceeding as described in the above example, but replacing the triethyl phosphite by an equivalent amount of tripropyl phosphite, there is obtained a similarly good yield of dipropyl 2-cyanopropene-3-phosphonate, B. P. 174–176° C./1–2 mm.

*Example 2.—Dimethyl 2-cyanopropene-3-phosphonate*

14.6 g. of α-bromomethyl acrylonitrile and 12.4 g. (0.1 mol) of trimethyl phosphite were heated in a distillation flask at such a temperature that methyl bromide (B. P. 4.6° C.) distilled from the reaction mixture. Heating was continued until all the calculated ethyl bromide for the reaction to go to completion had distilled over. The residual mixture in the flask was then fractionally distilled to give a good yield of dimethyl 2-cyanopropene-3-phosphonate, B. P. 137–140° C./1 mm.

*Example 3.—Dibutyl 2-cyanopropene-3-phosphonate*

(a) 14.6 g. (0.1 mol) of α-bromomethyl acrylonitrile and 25.0 g. (0.1 mol) of tributyl phosphite were heated in a distillation flask at such a temperature that butyl bromide (B. P. 101.6° C.) distilled from the reaction mixture. Heating of the mixture was continued until no more butyl bromide distilled over. The residual mixture was then fractionated to give a good yield of dibutyl 2-cyanopropene-3-phosphonate, B. P. 182–185° C./2 mm.

(b) 2.3 g. (0.1 mol) of metallic sodium plus 30 cc. of dry toluene were placed in a three-necked round-bottom flask equipped with a stirrer, a dropping funnel and a reflux condenser closed at the top with a calcium chloride tube. The toluene was gently refluxed and then 19.4 g. (0.1 mol) of dibutyl hydrogen phosphite were added dropwise. Refluxing and stirring were continued until all of the sodium had reacted. The sodium dibutyl phosphite thus obtained was cooled, and 10.2 g. (0.1 mol) of α-chloromethyl acrylonitrile were added dropwise. During this addition, the temperature was kept between 5° to 15° C. When all of the α-chloromethyl acrylonitrile had been added, the reaction mixture was heated at 80° C. for a period of two hours. The mixture was cooled and thoroughly washed with water. Fractionation of the mixture under reduced pressure gave dibutyl 2-cyanopropene-2-phosphonate.

By substituting an equivalent amount of the sodium salts of other dialkyl hydrogen phosphites for the sodium dibutyl phosphite in the above example, the corresponding cyanopropene phosphonates are readily prepared. For example sodium dimethyl phosphite gives dimethyl 2-cyanopropene-3-phosphonate, sodium diethyl phosphite gives diethyl 2-cyanopropene-3-phosphonate, and sodium dipropyl phosphite gives dipropyl 2-cyanopropene-3-phosphonate.

*Example 4.—Poly-dimethyl 2-cyanopropene-3-phosphonate*

10 g. of dimethyl 2-cyanopropene-3-phosphonate was polymerized at 100° C. in an atmosphere of nitrogen using 0.3% by weight of the unsaturate of acetyl peroxide. A clear, hard and moldable resin, which gave tough and flame resistant shaped objects, was obtained. It had a softening point above 80° C. and was soluble in such solvents as acetone, acetronitrile and dimethyl formamide.

Similar resinous homopolymers were obtained by proceeding with polymerizations as described in the above example with other of the mentioned dialkyl 2-cyanopropene-3-phosphonates such as, for example, poly-diethyl 2-cyanopropene-3-phosphonate, poly-dipropyl-2-cyanopropene phosponate, poly-dibutyl 2-cyanopropene-3-phosphonate, etc., all of which are clear, hard and moldable resins of like solubilities, toughness and flame resistance.

*Example 5.—Poly-dibutyl 2-cyanopropene-3-phosphonate*

10 g. of dibutyl 2-cyanopropene-3-phosphonate was added to 50 cc. of distilled water containing 1 g. of potassium laurate, 0.2 g. of potassium persulfate and 0.2 g. of sodium bisulfite. The polymerization was carried out by heating at 50° C. for a period of 12 hours. At the end of this time the polymer which had formed was precipitated by the addition of saturated aqueous sodium-chloride to the polymerization mixture. The precipitated polymer was washed with water and dried. On incorporation into a molding composition, it gave stable and tough shaped objects by compression molding methods. The polymer was soluble in acetone and acetonitrile.

The other mentioned dialkyl 2-cyanopropene-3-phosphonates of the invention can also be homopolymerized to resinous polymers by the process of the above example.

*Example 6.—Copolymer of diethyl 2-cyanopropene-3-phosphonate and methyl methacrylate*

5 g. of diethyl 2-cyanopropene-3-phosphonate, 10 g. of methyl methacrylate and 0.2 g. of benzoyl peroxide were heated at 80° to 85° C. for a period of 24 hours. A clear, hard moldable polymer was obtained. It was soluble in acetone.

*Example 7.—Copolymer of dipropyl 2-cyanopropene-3-phosphonate and acrylonitrile*

2 g. of dipropyl 2-cyanopropene-3-phosphonate, 8 g. of acrylonitrile, 0.2 g. of ammonium persulfate, 0.2 g. of sodium bisulfite and 2 g. of potassium laurate were added to 100 cc. of distilled water. Polymerization began immediately and was complete within 8 hours. The polymer precipitated from solution and was isolated by filtration, washed and dried. It was soluble in dimethyl formamide and dimethyl acetamide.

*Example 8.—Copolymer of dipropyl 2-cyanopropene-3-phosphonate and vinyl chloride*

2 g. of dipropyl 2-cyanopropene-3-phosphonate, 8 g. of vinyl chloride, 0.2 g. of ammonium persulfate, 0.2 g. of sodium bisulfite and 2 g. of potassium laurate were added to 100 cc. of distilled water. The mixture was stirred into an emulsion and polymerized by heating at 35° to 45° C. for a period of 16 hours. The polymer which had formed was precipitated by adding a saturated aqueous solution of sodium chloride to the polymerization mixture. The polymer was filtered off, washed with water and dried. It was soluble in methyl ethyl ketone and cyclohexanone.

*Example 9.—Copolymer of diethyl 2-cyanopropene-3-phosphonate and styrene*

5. g. of diethyl 2-cyanopropene-3-phosphonate, 10 g. of styrene and 0.2 g. of benzoyl peroxide were heated at 80° C. for a period of from 15 to 16 hours. A clear, moldable polymer was obtained. It was soluble in methylene chloride and acetone.

*Example 10.—Copolymer of dimethyl-2-cyanopropene-3-phosponate and acrylonitrile*

0.5 g. of dimethyl 2-cyanopropene-3-phosphonate, 9.5 g. of acrylonitrile, 0.2 g. of ammonium persulfate, 0.2 g. of sodium bisulfite and 2 g. of potassium laurate were added to 100 cc. of distilled water. Polymerization began immediately and was complete within 8 hours. The polymer precipitated from solution and was isolated by filtration, washed with water and dried. It was soluble in dimethyl formamide and in dimethyl acetamide.

*Example 11.—Copolymer of dibutyl 2-cyanopropene-3-phosphonate and methyl methoacrylate*

7.5 g. of dibutyl 2-cyanopropene-3-phosphonate, 2.5 g. of methyl methacrylate and 0.3 g. of benzoyl peroxide were placed in a sealed tube and heated at 80° C. for a period of 24 hours. A clear, soft polymer was obtained. It was soluble in methyl ethyl ketone.

*Example 12.—Copolymer of diethyl 2-cyanopropene-3-phosphonate and vinyl acetate*

9.5 g. of diethyl 2-cyanopropene-3-phosphonate, 0.5 g. of vinyl acetate and 0.3 g. of acetyl peroxide were placed in a sealed tube and heated at 100° C. for 36 hours. A clear, hard and moldable resin, which gave tough and flame-resistant shaped objects, was obtained. The polymer was soluble in acetone and in acetonitrile.

All of the polymers of the invention can be dissolved in one or more of the mentioned organic solvents to form solutions or dopes which can be extruded to filaments, coated to continuous sheets or applied as impregnating agents to paper and textile or fibrous materials. They are moldable with or without plasticizers, fillers, coloring matter, etc., by means of extrusion, injection or compression methods into shaped objects which are tough and flame resistant.

What we claim is:

1. A cyanopropene phosphonate having the following general formula:

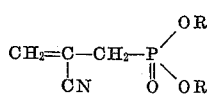

wherein R represents an alkyl group containing from 1 to 4 carbon atoms.

2. Dimethyl 2-cyanopropene-3-phosphonate.
3. Diethyl 2-cyanopropene-3-phosphonate.
4. Dipropyl 2-cyanopropene-3-phosphonate.
5. Dibutyl 2-cyanopropene-3-phosphonate.
6. A process for preparing a cyanopropene phosphonate having the following general formula:

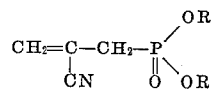

wherein R represents an alkyl group, comprising reacting an alpha-haloacrylonitrile with an organo phosphite compound selected from the group consisting of a trialkyl phosphite wherein the alkyl group contains from 1 to 4 carbon atoms and an alkali-metal salt of a dialkyl hydrogen phosphite wherein the alkyl group contains from 1 to 4 carbon atoms, heating the reaction mixture until the reaction is completed, and separating the cyanopropene phosphonate from the reaction mixture.

7. A process for preparing dimethyl 2-cyanopropene-3-phosphonate comprising reacting α-bromomethyl acrylonitrile with trimethyl phosphite, heating the reaction mixture until no more of the methyl bromide which forms distills off, and separating the dimethyl 2-cyanopropene-3-phosphonate by fractionally distilling the residual reaction mixture.

8. A process for preparing diethyl 2-cyanopropene-3-phosphonate comprising reacting α-bromomethyl acrylonitrile with triethyl phosphite, heating the reaction mixture until no more of the ethyl bromide which forms distills off, and separating the diethyl 2-cyanopropene-3-phosphonate by fractionally distilling the residual reaction mixture.

9. A process for preparing dipropyl 2-cyanopropene-3-phosphonate comprising reacting α-bromomethyl acrylonitrile with tripropyl phosphite, heating the reaction mixture until no more of the propyl bromide which forms distills off, and separating the dipropyl 2-cyanopropene-3-phosphonate by fractionally distilling the residual reaction mixture.

10. A process for preparing dibutyl 2-cyanopropene-3-phosphonate comprising recting α-bromomethyl acrylonitrile with tributyl phosphite, heating the reaction mixture until no more of the butyl bromide which forms distills off, and separating the dibutyl 2-cyanopropene-3-phosphonate by fractionally distilling the residual reaction mixture.

11. A process for preparing dibutyl 2-cyanopropene-3-phosphonate comprising adding α-bromomethyl acrylonitrile to sodium dibutyl phosphite while maintaining the mixture at from 0° to 15° C., heating the reaction mixture at refluxing temperature until completion of the reaction, and separating the dibutyl 2-cyanopropene-3-phosphonate by fractionally distilling the reaction mixture.

References Cited in the file of this patent

UNITED STATES PATENTS

| | | |
|---|---|---|
| 2,268,158 | Marvel | Dec. 30, 1941 |
| 2,436,926 | Jacobson | Mar. 2, 1948 |
| 2,491,920 | Ernsberger | Dec. 20, 1949 |
| 2,514,624 | Caldwell | July 11, 1950 |
| 2,550,651 | Dickey et al. | Apr. 24, 1951 |

OTHER REFERENCES

Nyler-Berichte, vol. 59, pg. 1126 (1926).